June 16, 1959 — F. KRAISSL, JR — 2,890,763
AIR FILTER SUMP AND JET
Filed Nov. 7, 1955
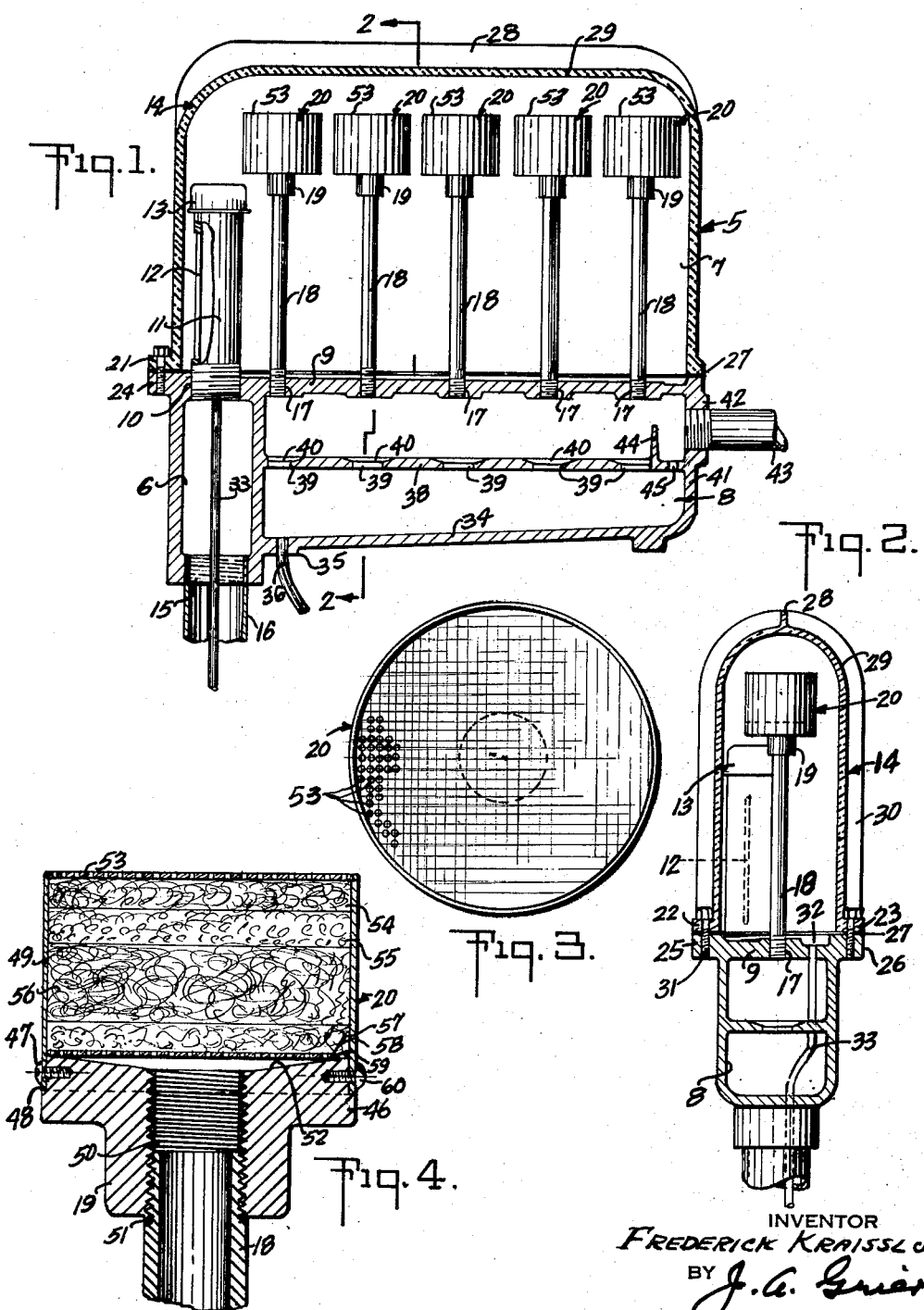
INVENTOR
FREDERICK KRAISSL JR.
BY
ATTORNEY though paper filters and other fibrous materials and even certain metal filters such as copper wool have the desired property.

2,890,763
AIR FILTER SUMP AND JET

Frederick Kraissl, Jr., Hackensack, N.J.

Application November 7, 1955, Serial No. 545,322

6 Claims. (Cl. 183—49)

This invention relates to improvements in filter systems and is directed more particularly to systems wherein the smoke or fog in compressed air or gas is removed therefrom in stages.

This smoke or fog is formed by minute droplets of lubricant which in many applications must be entirely or substantially entirely removed from the compressed air or gas before it can be used in said applications.

One object of this invention is the provision, in a filter system of the character described, of a filter chamber having one stage in which the fog bearing air or gas has the larger particles of the lubricant removed, due to the fact that they coalesce more readily than the finer particles. The finer particles are charged with the same electrical polarity and they repel one another and consequently the coalescing of these particles to remove them from the gas or air is difficult.

Another object of the invention is to provide within said chamber a plurality of filter paths, which (1) substantially reduces the velocity of the compressed air or gas within the chamber; (2) substantially reduces the quantity of air or gas that traverses each cubic inch of the filter material; thereby providing more excellent filter action and longer filter life, and giving to the filters the quality of lending cohesive effect toward the agglomeration of the lubricating cohesive effect toward the agglomeration of the lubrication particles with which the compressed gas or air is laden, and consequently decontaminated air or gas is delivered from my new and improved filter system.

Other objects and advantages of the invention will become apparent to those skilled in the art, upon a study of this specification and the accompanying drawings wherein:

Figure 1 is a longitudinal cross-sectional view of my filter;

Figure 2 is an elevation taken along the line 2—2 of Figure 1;

Figure 3 is a view of one of the unitary filter elements taken along the line 3—3 of Figure 4; and Figure 4 is an enlarged cross-sectional elevation of one of the filter heads, taken along the line 4—4 of Figure 1.

Referring first to Figures 1 and 2, my improved filter system is housed in a casing 5 which has its interior divided into several chambers as follows: a cylindrical chamber 6, having its axis disposed along a substantially vertical path, a horizontally disposed chamber 7, and a second horizontal chamber 8, the greater portion of which is disposed beneath the chamber 7.

Formed in a wall 9 which separates the chamber 7 from the chambers 6 and 8, is a threaded hole 10 which ordinarily provides communication between the chamber 6 and the chamber 7. Mounted in the threaded hole 10 is a length of pipe 11 which has an elongated slot 12 formed therein, preferably in a position where compressed air or gas delivered thereto (in a manner to be presently described) is discharged from said slot and impinges on the wall 14 adjacent to the pipe 11.

This pipe 11 has its upper end threaded to accommodate a cap or closure 13, the lower end of the chamber 6 carries an internal pipe thread 15 to which a pipe connection 16 may be made for the delivery of the compressed air or gas into the filter.

The wall 9 has a series of tapped holes 17 therein which are threadedly engaged by pipes 18, and threaded onto the upper end of each is a filter unit 20. In the embodiment shown, five such units are employed, each filter unit having a boss 19 on the lower end thereof and having a threaded hole therein to fit the threaded upper end of the pipe 18.

The upper portion of the chamber 7 is preferably transparent, and it has a main transparent wall 14 having flanges 21, 22, and 23 which match corresponding flanges about the perimeter of the wall 9 and designated as 24, 25 and 26, respectively.

The wall 14 has a curved upper portion 29 and formed integral therewith is a longitudinal rib 28 which stiffens the structure, and also, as shown in Figure 2, an end rib 30 may extend from the flange 22 in a lateral sense and over the top and downwardly to the flange 23. Extending through clearance holes in said flanges in spaced apart relation thereabout and engaging threaded holes in the latter flanges 24, 25, and 26, with a suitable gasket 27 therebetween, are cap screws 31 to form a fluid tight seal between the transparent element 14 and the flange extensions of the wall 9.

The wall 9 has a depression formed in its upper surface, and this depression has a portion 32 (Figure 2) which is deeper and is herein termed a sump because it must deliver the oil or the like, which was separated out from the lubricant laden "aerosol" by impinging on the interior walls of the chamber 7. In this depression is a threaded hole which is engaged by the threaded end of a drain tube 33 which passes through the chamber 6 and out therefrom within the inlet pipe 16.

The chamber 8 has a lower wall 34 which slopes to the left, as seen in Figure 1, and a boss 35 formed integral therewith has a threaded hole therein to receive a fitting 36, to which a drain tube is connected.

Between the wall 9 and the lower wall 34 is a wall 38 which has a series of holes 39 formed therein, and a countersink 40 is formed therein in communication with each hole to allow coalesced lubricant to drain down into the chamber 8 beneath said holes.

In an end wall 41 of the chamber 8 is a boss 42 which is threaded to receive a discharge pipe 43. Within the chamber and positioned on the wall 38 is a rib 44 which is spaced apart from the inner end of the pipe 43 to function as a baffle, and between this baffle and the inner end of the pipe 43 is a drain hole 45 which allows any lubricant which coalesces after it passes the baffle to fall through the drain hole 45 on to the inclined surface 34 so that it may pass out of the chamber 8 via the drain tube 37.

Referring now to Figures 3 and 4, I show details of construction of the filter elements 20. The boss 19 has a flange portion 46, which has its upper portion 47 of reduced diameter, thereby forming a shoulder 48 which forms a stop for the filter casing 49. Formed in the boss and flange is a central threaded hole 50 which accommodates the threads 51 formed on the pipe 18. The upper surface 52 of the flange 46 is funnel-shaped to deliver the coalesced oil into the pipe 18.

Now as to filter materials adapted to be permeated by the smoke laden gas or air and to cause the electrified and repellent particles of oil to come together and to coalesce, certain fibrous materials, such as kapok and other cotton and vegetable fibers, Fiberglas, glass wool, or synthetic fibers such as "nylon," "Orlon," or the like, either singly or in combinations, are very effective. For convenience and ease of handling, I form the filter elements into cartridges. The casing 49 has secured thereto or, formed integral therewith, a perforate end plate 53. Within the casing 49 and in contact with the perforate end plate 53 is a body or pad 54 of metallic wool, for example, steel, stainless steel wool, non-ferrous metallic wools or combinations thereof. In contact with the pad 54 is a second metallic wool pad 55. In contact with the pad 55 is a body 56 formed of one of the fibrous materials named above, formed of combinations thereof. A third body of metallic wool 57 is in contact with the body 56 and is also in contact with a perforate disc 58 which, in turn bears upon the upper surface 59 of the flange 46. The loaded casing 49 is placed on the portion 47 and is pressed downwardly until its rim is in contact with and is arrested by the shoulder 48, thereby compressing the bodies 54, 55, 56, and 57, a pre-determined amount, following which screws 60 are engaged with corresponding threaded holes in the portion 47.

All the bodies 54 to 57, inclusive, are applied dry in the cartridges, so that after they are put into use, the first smoke laden air passing through it will impregnate the fibers of the body 56 with the tiny particles of oil and thereby imparting to it the property of effecting the agglomeration of the lubricant particles subsequently.

Now the smoke laden air or gas, after the heavier particles of oil have been separated by impinging upon the inner surface of the casing via the slot 12 in the pipe 11, it passes into the open upper ends 53 of the filter elements 29 and is consequently divided into five paths, and its velocity is also reduced by about one-fifth, so that conditions for coalescing the particles and the drainage of the coalesced oil therefrom is ideal due to the fact that the reduced rate of movement through the filters, is effective in the agglomeration and coalescing of the particles of oil, and the quantity of oil is such that it has time to drain out of the fibrous body 56 and leave it in an impregnated condition at all times.

Now as to the use of different types of metallic wools, either singly or in combination, I have found that with some of the lubricating oils which have lately been developed, certain effects are produced on some of the metallic wools, while other and different effects occur with some others of the metallic wools, therefore by the use of one or more of the above named metallic wools singly or combined, I am able to offset the abovementioned deleterious effect of said oils and to obtain continuous and efficient filtering action.

Although I have herein shown and described by way of example, one embodiment of the invention and two forms of filters, it will be understood that the showings are illustrative of the invention, and not limitative, as many changes may be made in the arrangements shown within the scope of the following claims.

I claim:

1. In a filter device for removing minute particles of oil from a gaseous medium; an elongated casing having an inlet chamber, a discharge chamber, and an intermediate chamber; a separator device between said inlet chamber and said intermediate chamber adapted to deliver said medium into the latter in a manner to cause any particles of entrained oil to impinge on a portion of the wall of said intermediate chamber, a sump in said intermediate chamber, a drain pipe for draining said sump, a wall between said intermediate chamber and said discharge chamber, a series of filter elements supported in said wall, said elements each comprising a pipe and a filter head communicating therewith and having a filter cartridge in said head including fibrous matter adapted to be impregnated with minute particles of oil from the first medium passing therethrough and then adapted to effect the coalescing of the oil particles from said medium, an exit for leading filtered medium from said last chamber, and a second drain pipe delivering coalesced oil from said last chamber.

2. In a filter device for removing minute particles of oil from a gaseous medium; an elongated casing having an inlet chamber, a discharge chamber, and an intermediate chamber; a separator device between said inlet chamber and said intermediate chamber adapted to deliver said medium into the latter in a manner to cause any particles of entrained oil to impinge on a portion of the wall of said intermediate chamber, a sump in said intermediate chamber, a drain pipe for draining said sump, a horizontal wall between said intermediate chamber and said discharge chamber, a series of threaded holes in said wall, a series of pipes engaged with said holes and carrying filter heads; each filter head having a filter cartridge therein including vegetable fibers having qualities similar to kapok each being adapted, after being initially impregnated by minute particles of oil in said medium, to cause the minute particles to coalesce; an outlet for the filtered medium, and a second drain pipe for delivering coalesced oil from said last chamber.

3. In a filter device for removing minute particles of oil from a gaseous medium, an elongated casing having an inlet chamber, a discharge chamber, and an intermediate chamber, a separator device between said inlet chamber and said intermediate chamber adapted to deliver said medium into the latter in a manner to cause any particles of entrained oil to impinge on a portion of the wall of said intermediate chamber, a sump in said intermediate chamber, a drain pipe for draining said sump, a horizontal wall between said intermediate chamber and said discharge chamber, a perforate horizontal wall in said discharge chamber dividing it into an upper discharge passage and a lower drainage cavity, a discharge pipe connected to said discharge passage, a second drain pipe connected to a low point in said cavity, a series of tapped holes in said first wall, a threaded pipe engaging each tapped hole, a filter head on each of said pipes carrying a filter cartridge which includes at least one filter pad formed of kapok and initially impregnated by the passage of said medium therethrough and thereafter forming collectively a low velocity filter means.

4. In a filter device for removing minute particles of oil from a gaseous medium, an elongated casing divided into several chambers, an inlet pipe for delivering said medium into a first one of said chambers, a passage for delivering said medium to a second of said chambers, said passage terminating in a vertical slot adjacent to a wall of said second chamber so that said medium passes through said slot and moves toward said wall in a manner to cause droplets of oil entrained in the same to impinge upon said wall, a sump therein to receive said oil, a drain pipe to remove said oil from said second chamber, a plurality of filter elements each including synthetic fibers adapted to be impregnated with said minute particles of oil in the first medium passing therethrough and then adapted to force said particles into coalescence as they tend to pass through said filter, an exit for the filtered medium, and a second drain pipe to deliver the coalesced oil from said casing.

5. In a filter device for removing minute particles of oil from a gaseous medium, an elongated casing having an inlet chamber, a discharge chamber, and an intermediate chamber, a passage interconnected between said first chamber and said intermediate chamber and adapted to deliver said medium into the latter via a vertical slot formed in a wall of said passage and facing and adjacent to a wall of said intermediate chamber for causing said medium to strike said last wall in a manner to cause any particles of oil to impinge on a portion of said last wall, a sump in said intermediate chamber, a drain pipe for draining said sump, a wall between said intermediate chamber and said discharge chamber, a series of filter elements supported in threaded holes in said wall said elements each comprising a threaded pipe and a filter head communicating therewith and having a filter cartridge therein including plastic fibers adapted to be impregnated with minute particles of oil from the first medium passing therethrough and then adapted to effect the coalescing of the oil particles from said medium, an exit for leading filtered medium from said last chamber, and a second drain pipe delivering coalesced oil from said last chamber.

6. In a filter device for removing minute particles of oil from a gaseous medium, an elongated casing having an inlet chamber, a discharge chamber, and in intermediate chamber, a separator device between said inlet chamber and said intermediate chamber adapted to deliver said medium into the latter in a manner to cause any particles of oil to impinge on a portion of the wall of said intermediate chamber, a sump in said intermediate chamber, a drain pipe for draining said sump, a horizontal wall between said intermediate chamber and said discharge chamber, a series of threaded holes in said wall, a series of pipes engaged with said holes and carrying filter heads; each filter head having a filter cartridge therein including combinations of vegetable and synthetic fibers having qualities similar to kapok each being adapted, after being initially impregnated by minute particles of oil in said medium, to cause the minute particles to coalesce; an outlet for the filtered medium, and a second drain pipe for delivering coalesced oil from said last chamber.

References Cited in the file of this patent
UNITED STATES PATENTS

| | | |
|---|---|---|
| 1,538,150 | Wilson | May 19, 1925 |
| 1,714,854 | Dollinger | May 28, 1929 |
| 2,214,737 | Dauphinee | Sept. 17, 1940 |
| 2,234,788 | Williams | Mar. 11, 1941 |
| 2,255,519 | Preston | Sept. 9, 1941 |
| 2,698,061 | Jaubert | Dec. 28, 1954 |